US012780192B2

(12) United States Patent
Choi et al.

(10) Patent No.: US 12,780,192 B2
(45) Date of Patent: Nov. 3, 2026

(54) METHOD AND APPARATUS FOR CONTROLLING SPEED OF VEHICLE

(71) Applicants: Hyundai Motor Company, Seoul (KR); Kia Corporation, Seoul (KR)

(72) Inventors: Yoon Young Choi, Suwon-si (KR); Cheol Hwan Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 122 days.

(21) Appl. No.: 18/818,233

(22) Filed: Aug. 28, 2024

(65) Prior Publication Data

US 2025/0100554 A1 Mar. 27, 2025

(30) Foreign Application Priority Data

Sep. 25, 2023 (KR) ........................ 10-2023-0127755

(51) Int. Cl.
*B60W 30/14* (2006.01)

(52) U.S. Cl.
CPC ....... *B60W 30/143* (2013.01); *B60W 2520/10* (2013.01); *B60W 2555/60* (2020.02)

(58) Field of Classification Search
CPC ............... B60W 30/14; B60W 30/143; B60W 2520/10; B60W 2555/60
USPC ............................................................ 701/93
See application file for complete search history.

(56) References Cited

U.S. PATENT DOCUMENTS

| | | | | |
|---|---|---|---|---|
| 10,272,926 B2 * | 4/2019 | Yamashita | .......... | B60W 30/143 |
| 12,491,881 B2 * | 12/2025 | Bellinger | ............ | B60L 15/2054 |
| 2023/0347889 A1 * | 11/2023 | Yun | ..................... | B60W 60/001 |
| 2024/0043001 A1 * | 2/2024 | Hubbard | ............. | B60W 30/146 |
| 2024/0326799 A1 * | 10/2024 | Mansour | ......... | B60W 30/18072 |

* cited by examiner

*Primary Examiner* — Andrew Joseph Rudy
(74) *Attorney, Agent, or Firm* — Banner & Witcoff, Ltd.

(57) ABSTRACT

A vehicle control apparatus is provided. The vehicle control apparatus comprising: a reception unit for recognizing a plurality of events comprising a first event and a second event, and receiving information of the plurality of events and information comprising a set speed of a vehicle and a current speed of the vehicle; a determination unit for determining whether a control starting condition is satisfied; a calculation unit for calculating a reference distance for control, calculating a target speed using the reference distance for control, and modifying the target speed; and a vehicle control unit for performing control comprising acceleration and deceleration so that the vehicle travels at the target speed when the control starting condition is satisfied.

20 Claims, 9 Drawing Sheets

METHOD AND APPARATUS FOR CONTROLLING SPEED OF VEHICLE

CROSS-REFERENCE TO RELATED APPLICATION

This application claims the benefit of priority to Korean Patent Application No. 10-2023-0127755, filed in the Korean Intellectual Property Office on Sep. 25, 2023, the entire contents of which are incorporated herein by reference.

TECHNICAL FIELD

The present disclosure relates to a method and apparatus for controlling speed of a vehicle. More specifically, the present disclosure relates to a method and apparatus for controlling speed of a vehicle capable of preventing and/or reducing rapid acceleration and deceleration when the vehicle is traveling at a set speed.

BACKGROUND

The description in this section merely provides background information related to the present disclosure and does not necessarily constitute the related art.

Cruise control is a function that allows a driver to drive while maintaining the set speed set by a user without having to press an accelerator pedal or brake pedal. With the advancement of autonomous driving technology, a function to change the vehicle speed according to the speed limit of events that occur while driving may be provided as one of the cruise control capabilities. For example, when there is an event ahead, such as an interchange, junction, tollgate, or speed limit change, a vehicle equipped with the cruise control may decelerate according to the set speed limit. Additionally, when the event ends, the vehicle equipped with the cruise control may accelerate to return to the set speed.

However, a plurality of events that occur while driving may occur at short distance intervals. In this connection, when the set speed is higher than the speed limit or safe speed, sudden deceleration and/or sudden acceleration may be repeated. Repeated sudden deceleration and sudden acceleration may reduce vehicle safety and fuel efficiency, and passenger comfort.

SUMMARY

The following summary presents a simplified summary of certain features. The summary is not an extensive overview and is not intended to identify key or critical elements.

An aspect of the present disclosure is to provide a method and apparatus for preventing and/or reducing sudden acceleration and deceleration of a vehicle due to an event.

The aspects of the present disclosure are not limited to those mentioned above, and other aspects not mentioned herein will be clearly understood by those skilled in the art from the following description.

An apparatus may comprise: at least one sensor; one or more processors; and memory storing instructions that, when executed by the one or more processors, cause the apparatus to: determine, based on at least one of sensing information of the at least one sensor or navigation information, a plurality of events comprising a first event and a second event, wherein the first event is associated with a first speed control in a first section of a driving route of a vehicle, and wherein the second event is associated with a second speed control in a second section of the driving route; determine information of the plurality of events and information of the vehicle, wherein the information of the vehicle comprises a set speed of the vehicle and a current speed of the vehicle; determine a reference distance for determining whether to perform a target speed adjustment for the vehicle in an intermediate section, of the driving route, between an end point of the first section and a starting point of the second section; determine, based on the reference distance, an adjusted target speed in the intermediate section; and perform, based on the adjusted target speed, a speed control of the vehicle driving in the intermediate section.

The instructions, when executed by the one or more processors, may cause the apparatus to determine to perform the target speed adjustment based on: the vehicle being located in the first section or the intermediate section, the set speed being higher than a speed limit of the second event, and the reference distance being greater than a distance between the end point of the first section and the starting point of the second section.

The instructions, when executed by the one or more processors, may cause the apparatus to determine the adjusted target speed further based on: the set speed, and a distance between the end point of the first section and the starting point of the second section.

The instructions, when executed by the one or more processors, may cause the apparatus to determine the adjusted target speed by multiplying an initial adjusted target speed by a predefined positive number less than 1.

The instructions, when executed by the one or more processors, may cause the apparatus to determine the adjusted target speed after the vehicle passes the end point of the first section.

The instructions, when executed by the one or more processors, may cause the apparatus to determine the adjusted target speed to be slower than an unadjusted target speed.

The instructions, when executed by the one or more processors, may cause the apparatus to determine the adjusted target speed to be faster than or equal to both the current speed of the vehicle and a speed limit of the second event.

The instructions, when executed by the one or more processors, may cause the apparatus to determine the reference distance such that the reference distance includes an acceleration distance and a deceleration distance.

The instructions, when executed by the one or more processors, may cause the apparatus to control the vehicle to travel at the set speed before a control starting condition being satisfied.

The instructions, when executed by the one or more processors, may cause the apparatus to control the vehicle to travel at a speed limit of the second section when the vehicle is located in the second section.

A method, performed by an apparatus of a vehicle, may comprise: determining, based on at least one of sensing information of at least one sensor or navigation information, a plurality of events comprising a first event and a second event, wherein the first event is associated with a first speed control in a first section of a driving route of the vehicle, and wherein the second event is associated with a second speed control in a second section of the driving route; determining information of the plurality of events and information of the vehicle, wherein the information of the vehicle comprises a set speed of the vehicle and a current speed of the vehicle; determining a reference distance for determining whether to perform a target speed adjustment for the vehicle in an intermediate section, of the driving route, between an end point of the first section and a starting point of the second section; determining, based on the reference distance, an adjusted target speed in the intermediate section; and performing, based on the adjusted target speed, a speed control of the vehicle driving in the intermediate section.

The method may further comprise determining whether to perform the target speed adjustment based on: the vehicle being located in the first section or the intermediate section, the set speed being higher than a speed limit of the second event, and the reference distance being greater than a distance between the end point of the first section and the starting point of the second section.

The adjusted target speed may be determined further based on the set speed and a distance between the end point of the first section and the starting point of the second section.

The adjusted target speed may be determined by multiplying an initial adjusted target speed by a predefined positive number less than 1.

The adjusted target speed may be determined after the vehicle passes the end point of the first section.

The adjusted target speed may be determined to be slower than an unadjusted target speed.

The adjusted target speed may be determined to be faster than or equal to both the current speed of the vehicle and a speed limit of the second event.

The reference distance may include an acceleration distance and a deceleration distance.

The method may further comprise controlling the vehicle to travel at the set speed before the control starting condition being satisfied.

The method may further comprise controlling the vehicle to travel at a speed limit of the second section when the vehicle is located in the second section.

According to the present disclosure, a vehicle control apparatus is provided. The vehicle control apparatus comprising: a reception unit for recognizing a plurality of events comprising a first event and a second event, and receiving information of the plurality of events and information comprising a set speed of a vehicle and a current speed of the vehicle; a determination unit for determining whether a control starting condition is satisfied; a calculation unit for calculating a reference distance for control, calculating a target speed using the reference distance for control, and modifying the target speed; and a vehicle control unit for performing control comprising acceleration and deceleration so that the vehicle travels at the target speed when the control starting condition is satisfied.

According to the present disclosure, a method for controlling, by a vehicle control apparatus, speed of a vehicle, is provided. The method comprising: recognizing a plurality of events comprising a first event and a second event; receiving information of the plurality of events and information comprising a set speed of the vehicle and a current speed of the vehicle; determining whether a control starting condition is satisfied; calculating a reference distance for control, and calculating a target speed using the reference distance for control; modifying the target speed; and performing control comprising acceleration and deceleration so that the vehicle travels at the target speed when the control starting condition is satisfied.

According to an embodiment of the present disclosure, by adjusting the set speed according to the distance between a plurality of events, sudden acceleration and deceleration of a vehicle due to events can be prevented.

The benefits of the present disclosure are not limited to those mentioned above, and other benefits not mentioned herein will be clearly understood by those skilled in the art from the following description.

These and other features and advantages are described in greater detail below.

DETAILED DESCRIPTION

Figure 1:
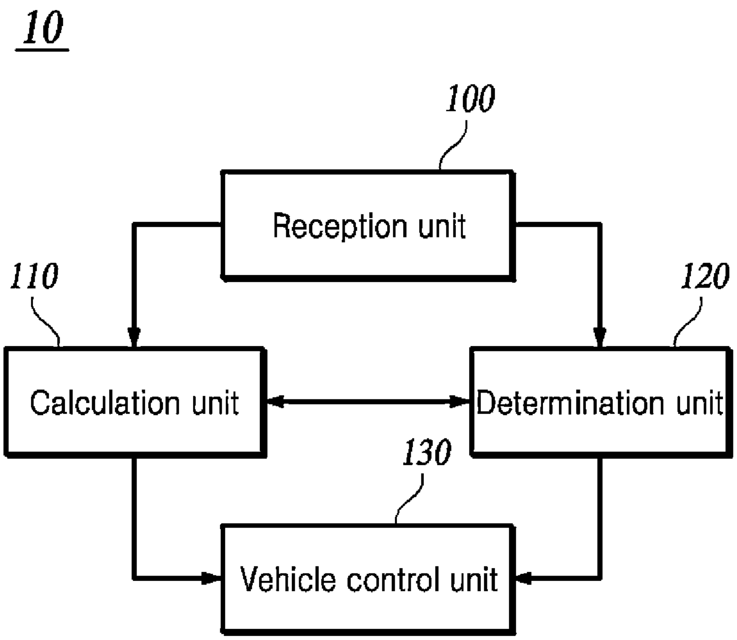
FIG. 1 is a schematic block diagram of a vehicle control apparatus.

Hereinafter, some examples of the present disclosure will be described in detail with reference to the accompanying drawings. In the following description, like reference numerals preferably designate like elements, although the elements are shown in different drawings. Further, in the following description of some examples, a detailed description of related known components and functions when considered obscuring the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

The detailed description set forth below in conjunction with the appended drawings is intended to describe exemplary examples of the present disclosure and is not intended to represent the only examples in which the present disclosure may be practiced.

As used below, singular terms may include plural terms unless otherwise specified.

Figure 5A:
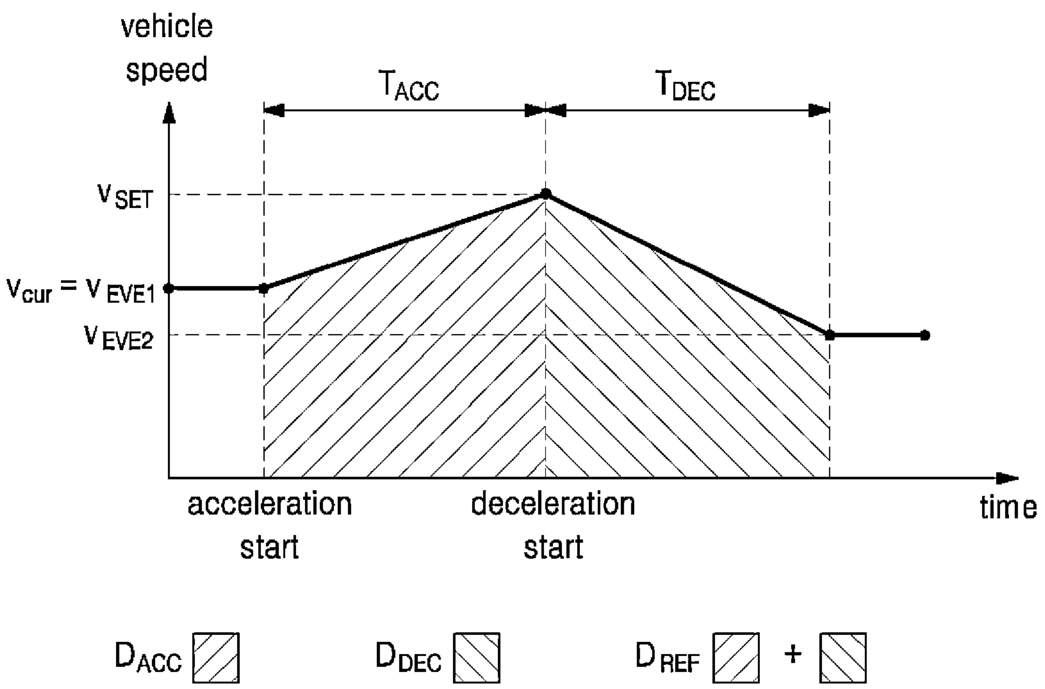
FIG. 5A to FIG. 5D are diagrams referenced to explain the operation of a vehicle control apparatus.
Figure 5B:
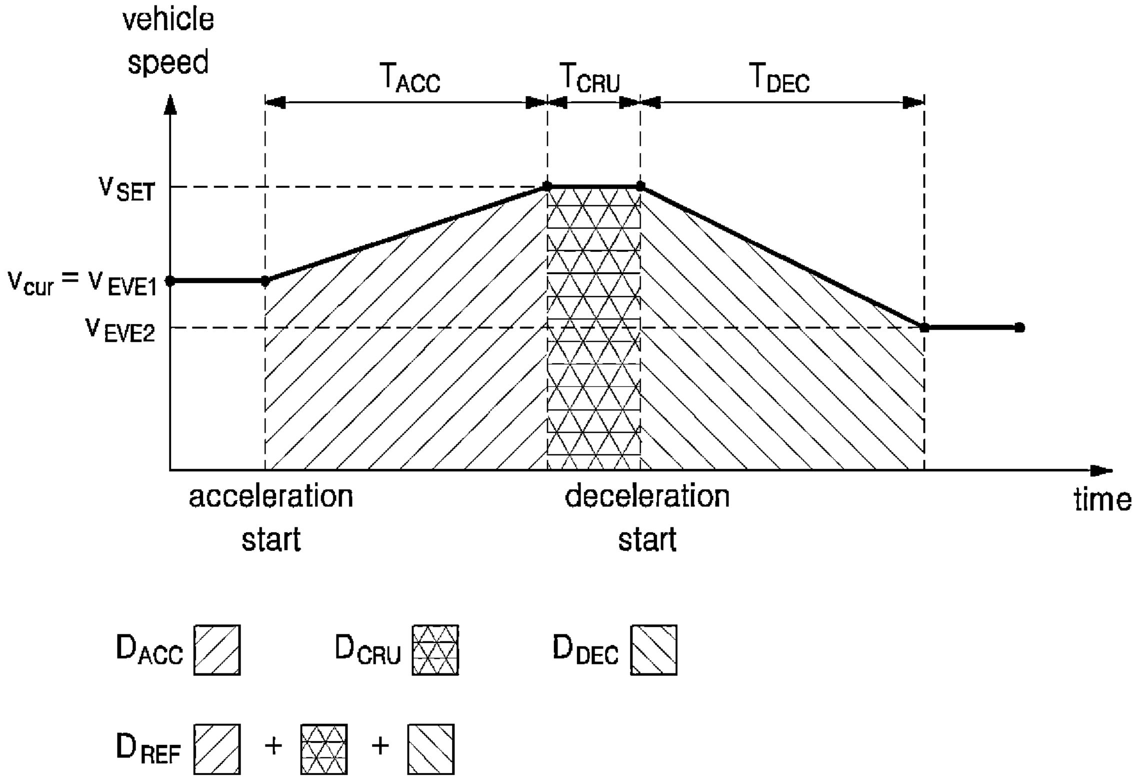
Figure 5C:
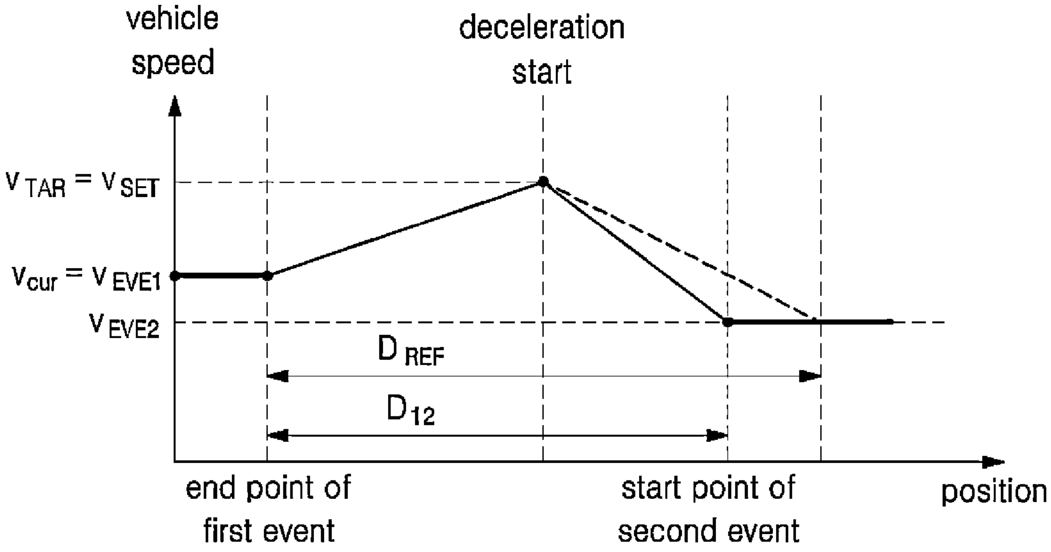

FIG. 1 is a schematic block diagram of a vehicle control apparatus according to an example of the present disclosure. FIG. 5A to FIG. 5C are diagrams referenced to explain the operation of a vehicle control apparatus. The components illustrated in FIG. 1 represent functionally distinct elements, and at least one or more components may be implemented in an integrated form in an actual physical environment.

Referring to FIG. 1, a vehicle control apparatus 10 may include all or a part of a reception unit 100, a calculation unit 110, a determination unit 120, and a vehicle control unit 130. One or more of the reception unit 100, the calculation unit 110, the determination unit 120, and/or the vehicle control unit 130 may be implemented by using one or more controllers (e.g., one or more processors), and/or memory storing instructions that, when executed by the one or more controllers, cause a computing device to perform one or more operations described herein.

The reception unit 100 may recognize an event existing in front of a vehicle. Herein, an event may refer to an occasion or place where the speed limit or driving speed of a vehicle needs to be changed. Events include, but are not limited to, interchanges, junctions, tollgates, speed limit change signs, sharp curves, construction signs, and children protection zone signs. The recognition distance of the reception unit 100 may be adjusted. For example, the recognition distance may be adjusted so that the reception unit 100 may recognize only events within a specific distance (e.g., 1 km, 1 mile, etc.) in front of a vehicle. Herein, the numerical value of 1 km or 1 mile is merely an example for explanation, and the recognition distance is not limited there.

The reception unit 100 may receive event information of the recognized event. The reception unit 100 may receive event information existing in front from, for example, at least one of a camera, LADAR, LiDAR, and navigation mounted on a vehicle. The object from which the reception unit 100 receives event information is not limited to the aforementioned apparatus or software. The reception unit 100 may receive event information from any apparatus or software that may collect the event information.

Event information may be information about events that exist or may occur in an area ahead of (e.g., a location in front of) a vehicle. The event information may include, for example, the location of the start and end points of an event, the distance from a vehicle to an event start point, the distance from the vehicle to an event end point, the distance between the start and end points of the event, the distance between the end point of one event and the start point of a next event, the speed limit of an event, and the type of an event. The reception unit 100 may recognize a plurality of events and receive event information for each event. For example, the reception unit 100 may recognize a first event (e.g., an upcoming event that causes a speed adjustment of the vehicle from the current vehicle speed) and a second event (e.g., a remote event that causes a subsequent speed adjustment of the vehicle after a preceding speed adjustment associated with the first event). The reception unit 100 may receive first event information for the first event and second event information for the second event. Herein, the first event may refer to an event of which start point or end point is closest to a vehicle. The second event may refer to an event having a start point closest to the end point of the first event.

The reception unit 100 may receive the current speed and set speed of a vehicle. The set speed is the speed preset by a driver or a user. The set speed may be changed. For example, the set speed can be changed by the manipulation of the driver.

The reception unit 100 may transmit the received information to the determination unit 120. Herein, the received information may include all of the presence or absence of an event, the current speed of a vehicle, the set speed, and/or event information.

Referring FIG. 5A, the calculation unit 110 may calculate an acceleration time $T_{ACC}$, a deceleration time $T_{DEC}$, an acceleration distance $D_{ACC}$, and/or a deceleration distance $D_{DEC}$. The acceleration time $T_{ACC}$ may refer to the time from the current speed $v_{CURRENT}$ to reach the set speed $v_{SET}$ when a vehicle accelerates using a preset acceleration. The deceleration time may refer to the time it takes to reach the speed limit $v_{EVE2}$ from a set speed $v_{SET}$ or target speed when a vehicle decelerates using a preset deceleration. The acceleration distance $D_{ACC}$ may refer to the distance traveled by a vehicle until a vehicle speed reaches a set speed $v_{SET}$ when the vehicle is accelerated using a preset acceleration. The deceleration distance $D_{DEC}$ may refer to the distance traveled by a vehicle until a vehicle speed reaches a speed limit $v_{EVE2}$ when the vehicle is decelerated using a preset deceleration.

Referring FIG. 5B, the calculation unit 110 may calculate a cruise distance $D_{CRU}$. Herein, the cruising distance $D_{CRU}$ may be the distance traveled at a set speed $v_{SET}$. A cruising time $T_{CRU}$ may refer to the time traveled at a set speed $v_{SET}$. The cruising time $T_{CRU}$ may be a preset particular time. The cruising distance $d_{CRU}$ may be calculated, for example, by multiplying the set speed $v_{SET}$ and cruising time $T_{CRU}$.

The calculation unit 110 may calculate a control reference distance $D_{REF}$. The control reference distance $D_{REF}$ may be the reference distance that serves as a basis for determination to control acceleration and deceleration of a vehicle. For example, the control reference distance $D_{REF}$ may be calculated by adding the acceleration distance $D_{ACC}$, deceleration distance $D_{DEC}$, and cruising distance $D_{CRU}$. As another example, the control reference distance $D_{REF}$ may be calculated by adding the acceleration distance $D_{ACC}$ and deceleration distance $D_{DEC}$.

The calculation unit 110 may determine a target speed in an intermediate section between an end point of one event to the start point of the next event. In general, the calculation unit 110 may determine the set speed $v_{SET}$ as the target speed. However, if the distance $D_{12}$ of the intermediate section is shorter than the reference distance $D_{REF}$, the speed of the vehicle may not reach the speed limit $v_{EVE2}$ at the start point of the second event, or a sudden acceleration or deceleration is required to reach the speed limit $v_{EVE2}$, as shown in FIG. 5C.

Figure 5D:
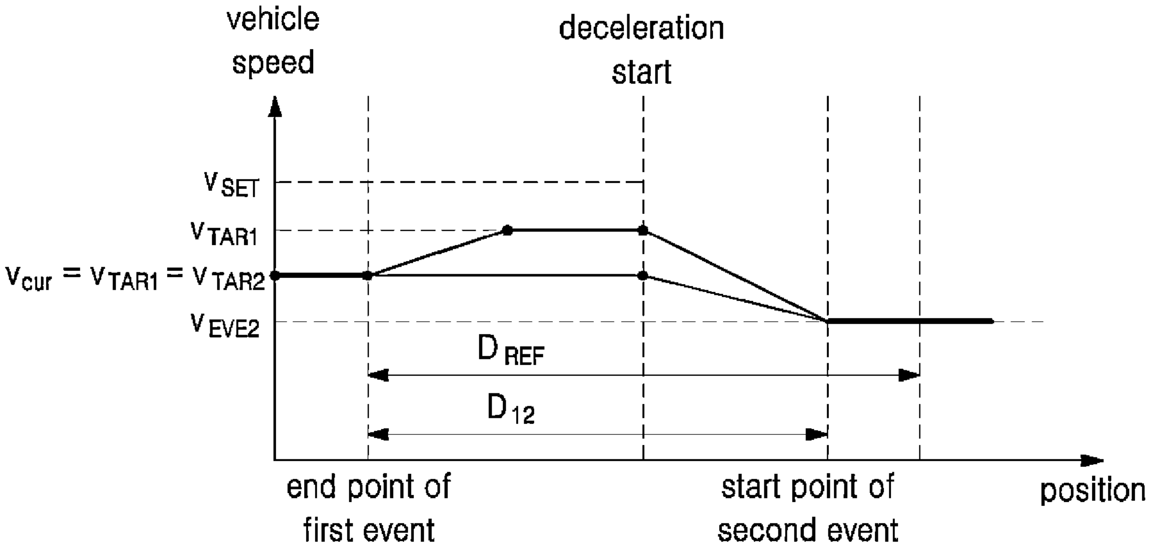

To prevent is, the calculation unit 110 may adjust the target speed. Referring FIG. 5D, the adjusted target speed $v_{TAR1}$ Or $v_{TAR2}$ may be the speed at which a vehicle can travel from the end point of one event to the start point of the next event without a sudden acceleration or deceleration. The calculation unit 110 may determine the adjusted target speed $v_{TAR1}$ Or $v_{TAR2}$ of a vehicle using the control reference distance $D_{REF}$ and the distance $D_{12}$ between the vehicle and the end point of one event and the start point of the next event. For example, the target speed of the vehicle may be calculated as shown in Equation 1.

$$v_{tar} = \begin{cases} v_{set}, & D_{12} \geq D_{REF} \\ v_{set} \times \left(\frac{D_{12}}{D_{REF}}\right) \times b, & D_{12} < D_{REF} \end{cases} \quad \text{[Equation 1]}$$

Herein, $v_{tar}$ is the target speed of a vehicle in the intermediate section, $v_{set}$ is the set speed of the vehicle, $D_{12}$ is the distance from the end point of a first event to the start point of a second event, $D_{REF}$ is the control reference distance, and b is a constant for adjusting the target speed. Herein, b is a predefined positive number equal to or less than 1. b may be changed by a setting.

The calculation unit 110 may modify the adjusted target speed $v_{TAR1}$ Or $v_{TAR2}$. The calculation unit 110 may modify the adjusted target speed $v_{TAR1}$ Or $v_{TAR2}$ using the current speed $v_{CUR}$ of a vehicle and/or the speed limit $v_{EVE2}$ of the second event. For example, the calculation unit 110 may change the target speed to the faster speed of the current speed $v_{CUR}$ of the vehicle or the speed limit $v_{EVE2}$ of the second event.

The calculation unit 110 may compare the adjusted target speed $v_{TAR1}$ Or $v_{TAR2}$ and the current speed $v_{CUR}$. The calculation unit 110 may compare the adjusted target speed $v_{TAR1}$ Or $v_{TAR2}$ and the speed limit $v_{EVE2}$ of the second event. If the adjusted target speed $v_{TAR1}$ or $v_{TAR2}$ is greater than or equal to the current speed $v_{CUR}$ and the speed limit $v_{EVE2}$ of the second event, the calculation unit 110 may not modify the adjusted target speed $v_{TAR1}$ Or $v_{TAR2}$. If the adjusted target speed $v_{TAR1}$ Or $v_{TAR2}$ is less than the current speed $v_{CUR}$ or the speed limit $v_{EVE2}$ of the second event, the calculation unit 110 may modify the adjusted target speed $v_{TAR1}$ or $v_{TAR2}$. In this case, the target speed of the vehicle may be represented as shown in Equation 2.

$$v_{tar} = \begin{cases} v_{set}, & D_{12} \geq D_{REF} \\ \max\left(v_{set} \times \left(\frac{D_{12}}{D_{REF}}\right) \times b,\ v_{cur},\ v_{eve2}\right), & D_{12} < D_{REF} \end{cases} \quad \text{[Equation 2]}$$

The determination unit 120 may determine whether a vehicle is located within an event section. The event section may refer to the section between the start point and end point of an event. For example, if a vehicle passes the start point of the event but does not pass the end point, the determination unit 120 may determine that the vehicle is located within the event section.

The determination unit 120 may determine whether a control starting condition is satisfied. The control starting condition may be a condition for determining whether to perform a target speed adjustment for the vehicle in the intermediate section. Hereinafter, the process by which the determination unit 120 determines whether the control starting condition is satisfied will be described in detail with reference to FIG. 2.

Figure 2:
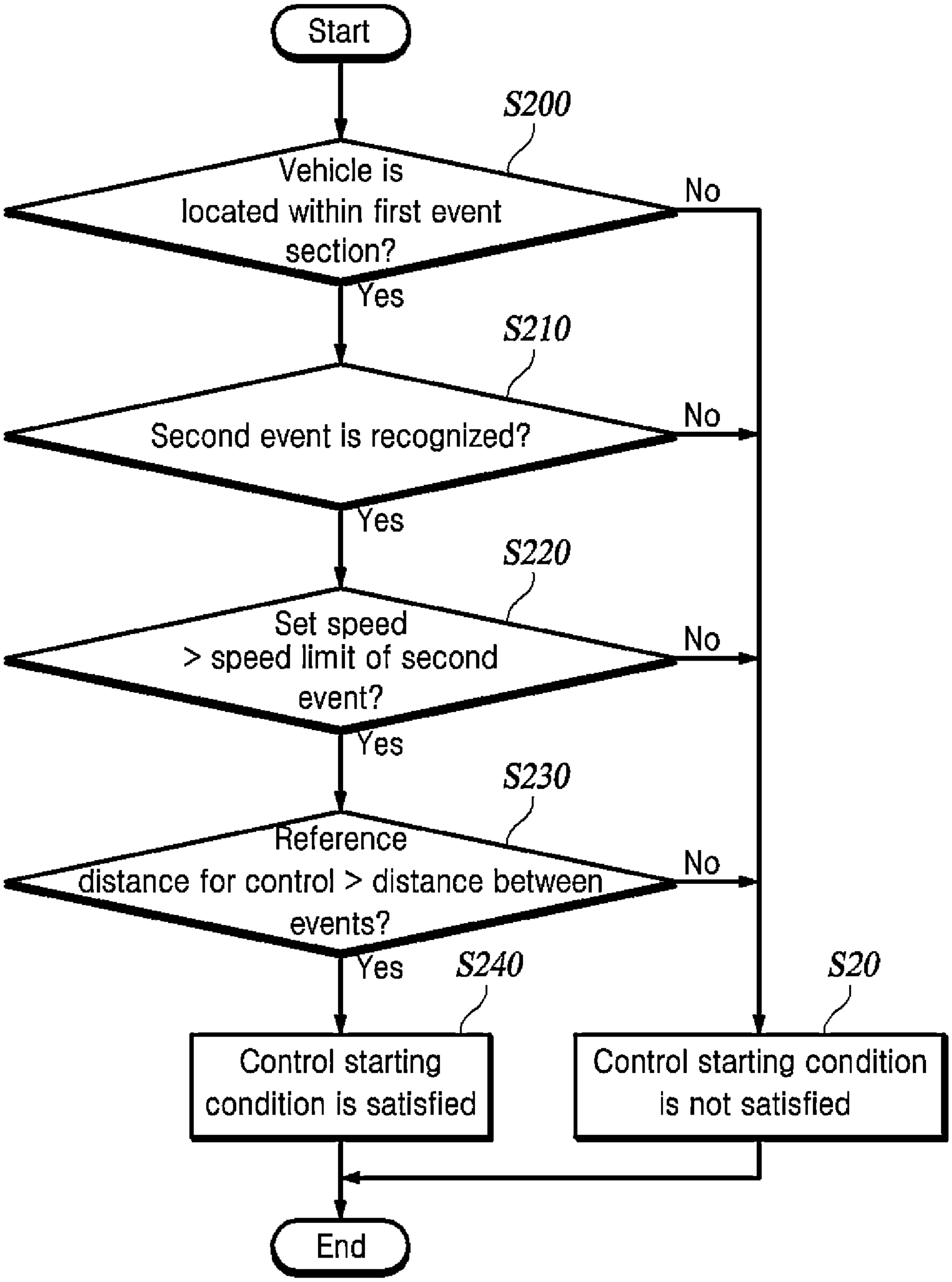
FIG. 2 is a flowchart illustrating a method for determining whether a control starting condition is satisfied.

FIG. 2 is a flowchart illustrating a method for determining whether a control starting condition is satisfied.

Referring to FIG. 2, a vehicle (e.g., the determination unit 120 or any other part of the vehicle) may determine whether the vehicle is located within a first event section (S200). If a vehicle is not currently located within the first event section, the vehicle (e.g., the determination unit 120 or any other part of the vehicle) may determine that the control starting condition is not satisfied (S20).

If the vehicle is located within the first event section, the vehicle (e.g., the determination unit 120 or any other part of the vehicle) may check whether the second event has been recognized (e.g., whether the reception unit 100 has recognized the second event) (S210). If the vehicle (e.g., the reception unit 100) does not recognize the second event, the vehicle (e.g., the determination unit 120) may determine that the control starting condition is not satisfied (S20).

If the vehicle (e.g., the reception unit 100) recognizes the second event, the vehicle (e.g., the determination unit 120) may compare a set speed with a speed limit of the second event (S220). If the set speed is lower than or equal to the speed limit of the second event, the vehicle (e.g., the determination unit 120) may determine that the control starting condition is not satisfied (S20).

If the set speed is higher than the speed limit of the second event, the vehicle (e.g., the determination unit 120) may calculate the control reference distance and the distance between events (S230). The distance between events may be the distance between the end point of the first event and the start point of the second event. If the control reference distance is shorter than or equal to the distance between events, the vehicle (e.g., the determination unit 120) may determine that the control starting condition is not satisfied (S20).

If the control reference distance is longer than or equal to the distance between events, the vehicle (e.g., the determination unit 120) may determine that the control starting condition is satisfied (S240).

The vehicle control unit 130 may control acceleration or deceleration of a vehicle. The vehicle control unit 130 may control acceleration or deceleration of the vehicle by controlling a driving part of the vehicle. For example, the vehicle control unit 130 may control acceleration or deceleration of the vehicle by controlling at least one of an engine, gearbox, and brakes of the vehicle. In some configurations, the vehicle control unit 130 may control acceleration or deceleration of the vehicle by controlling a motor of the vehicle. The described vehicle components are for illustrative purposes only, and the vehicle control unit 130 may control the speed of the vehicle using all means for controlling the speed of the vehicle.

The vehicle control unit 130 may control a vehicle so that the speed of the vehicle becomes the speed limit of an event within the event section. If the vehicle is located outside the event section, the vehicle control unit 130 may control the vehicle so that the speed of the vehicle becomes a set speed.

The vehicle control unit 130 may control a vehicle using the adjusted target speed instead of the set speed. If the vehicle (e.g., the determination unit 120) determines that the control starting condition is satisfied, the vehicle (e.g., the vehicle control unit 130 or any other part of the vehicle) may control the vehicle using the adjusted target speed instead of the set speed. In other words, the vehicle is controlled so that the speed of the vehicle reaches the adjusted target speed.

The vehicle control unit 130 may accelerate a vehicle after the vehicle passes the event end point. The vehicle control unit 130 may accelerate the vehicle to a target speed (e.g., the set speed or the adjusted target speed).

The vehicle control unit 130 may decelerate a vehicle from the point where the distance between the current vehicle and the event start point becomes equal to the deceleration distance. The vehicle control unit 130 may control the speed of the vehicle using a preset deceleration. The vehicle control unit 130 may decelerate the vehicle to the event speed limit.

Figure 3:
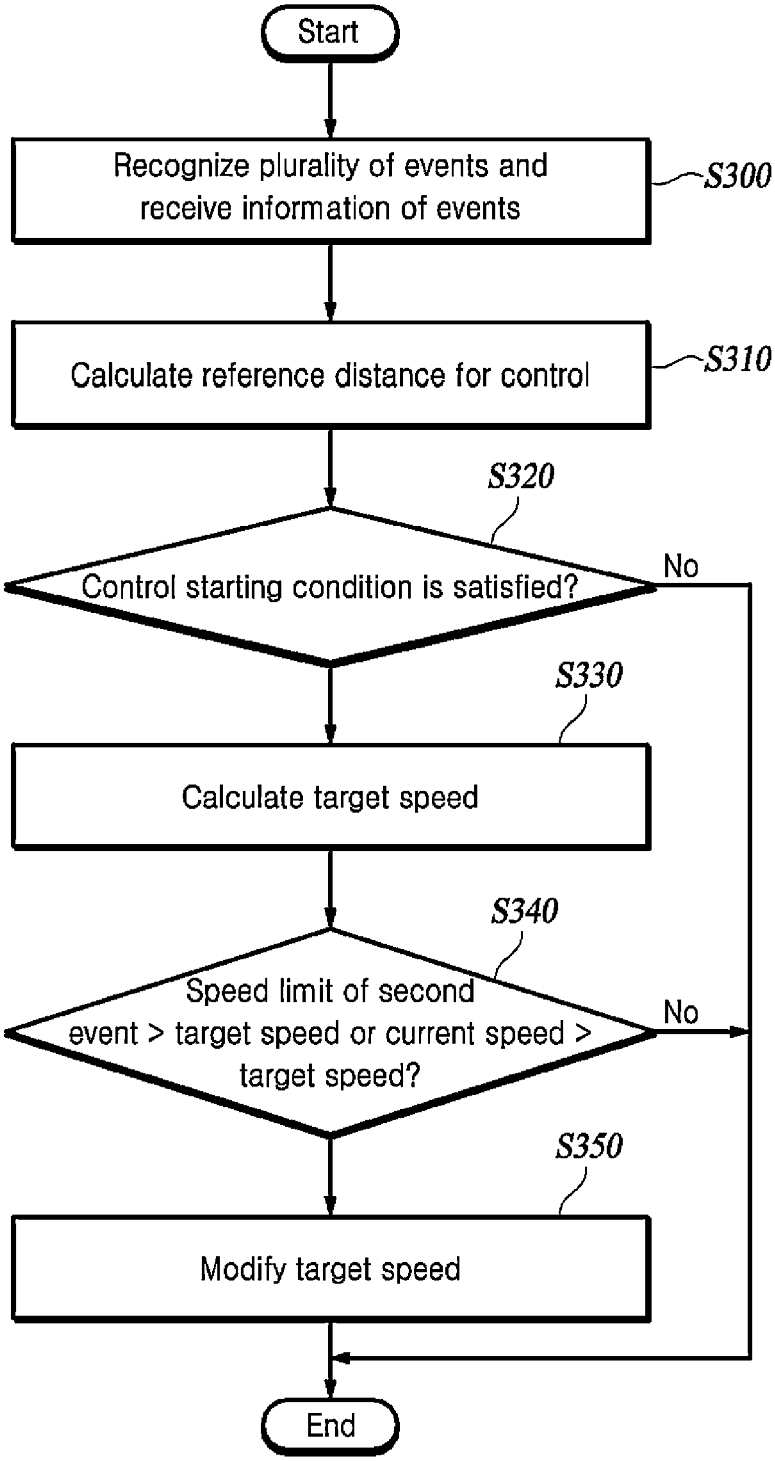
FIG. 3 is a flowchart illustrating a method for controlling speed of a vehicle.

FIG. 3 is a flowchart illustrating a method for controlling the speed of a vehicle.

Referring to FIG. 3, the vehicle (e.g., the reception unit 100 or any other part of the vehicle) may recognize the first event and the second event and receive information on the events, respectively (S300). Herein, the information on the events may include the location of the start and end points of an event, the distance from a vehicle to an event start point, the distance from the vehicle to an event end point, the distance between the start and end points of the event, the distance between the end point of one event and the start point of a next event, the speed limit of an event, and/or the type of an event.

The vehicle (e.g., the calculation unit 110 or any other part of the vehicle) may calculate an acceleration distance, a cruising distance, and a deceleration distance. The vehicle (e.g., the calculation unit 110) may calculate an acceleration time and a deceleration time. The calculation unit 110 may calculate the control reference distance using at least one of the acceleration distance, cruise distance, and deceleration distance (S310).

The vehicle (e.g., the determination unit 120 or any other part of the vehicle) may determine whether the control starting condition of a vehicle is satisfied (S320). If the control starting condition is not satisfied, the vehicle (e.g., the determination unit) may end a vehicle control process.

If the control starting condition is satisfied, the vehicle (e.g., the calculation unit 110) may calculate the target speed (S330). The calculation unit 110 may calculate the target speed using the set speed, control reference distance, and the distance from the end point of the first event to the start point of the second event.

The vehicle (e.g., the calculation unit 110) may determine whether the target speed is lower than the speed limit of the second event or lower than the current speed of a vehicle (S340). If the target speed is higher than or equal to the current speed of the vehicle and the speed limit of the second event, the vehicle (e.g., the calculation unit 110) may not modify the target speed.

If the target speed is lower than the current speed of a vehicle or the speed limit of the second event, the vehicle (e.g., the calculation unit 110) may modify the target speed (S350). The calculation unit 110 may modify the target speed to the higher speed of the current speed of the vehicle or the speed limit of the second event.

If a vehicle passes the end point of the first event, the vehicle control unit 130 may accelerate the speed of the vehicle to the target speed. The vehicle (e.g., the vehicle control unit 130) may accelerate the speed of the vehicle to the target speed using a predefined acceleration.

If the distance to the start point of the second event becomes equal to the deceleration distance, the vehicle (e.g., the vehicle control unit 130) may decelerate the speed of a vehicle to the speed limit of the second event.

Figure 4:
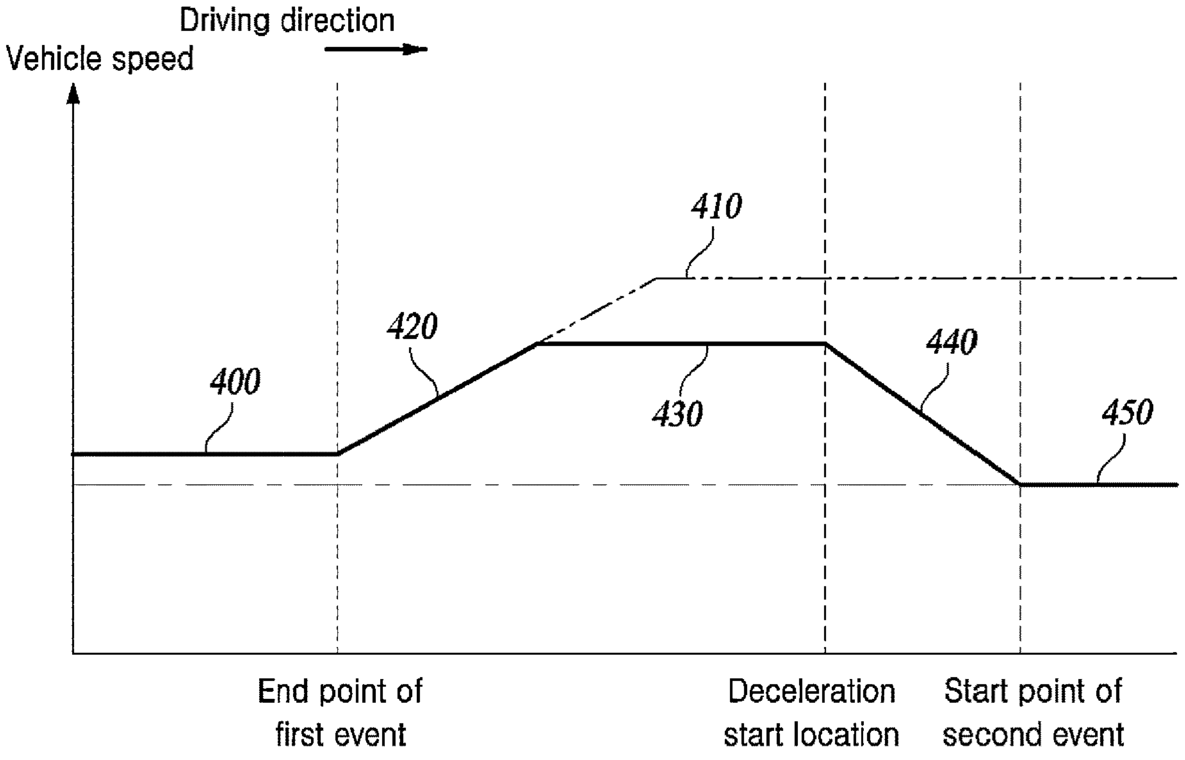
FIG. 4 is a diagram illustrating a change in speed depending on the location of a vehicle.

FIG. 4 is a diagram illustrating a change in speed depending on the location of a vehicle.

Referring to FIG. 4, a vehicle travels at the speed limit of the first event within the first event section (400).

If the vehicle recognizes the second event, the adjusted target speed may be determined. If the second event is not recognized, the vehicle may change its target speed to the set speed. The vehicle may accelerate to increase the vehicle speed to the set speed and travel at a set speed (410).

After a vehicle passes the end point of the first event section, the vehicle begins to accelerate (420). The vehicle accelerates using a preset acceleration. The vehicle accelerates to the adjusted target speed, for example, if the second event is recognized.

The vehicle travels at the adjusted target speed to a deceleration start location (430).

Upon arriving at the deceleration start location, the vehicle decelerates using a preset deceleration (440). Herein, the deceleration start location may be a point where the distance between the vehicle and the start point of the second event is equal to the deceleration distance. The vehicle decelerates to the speed limit of the second event.

When the vehicle passes the start point of the second event, the vehicle travels at the speed limit of the second event (450).

Figure 6:
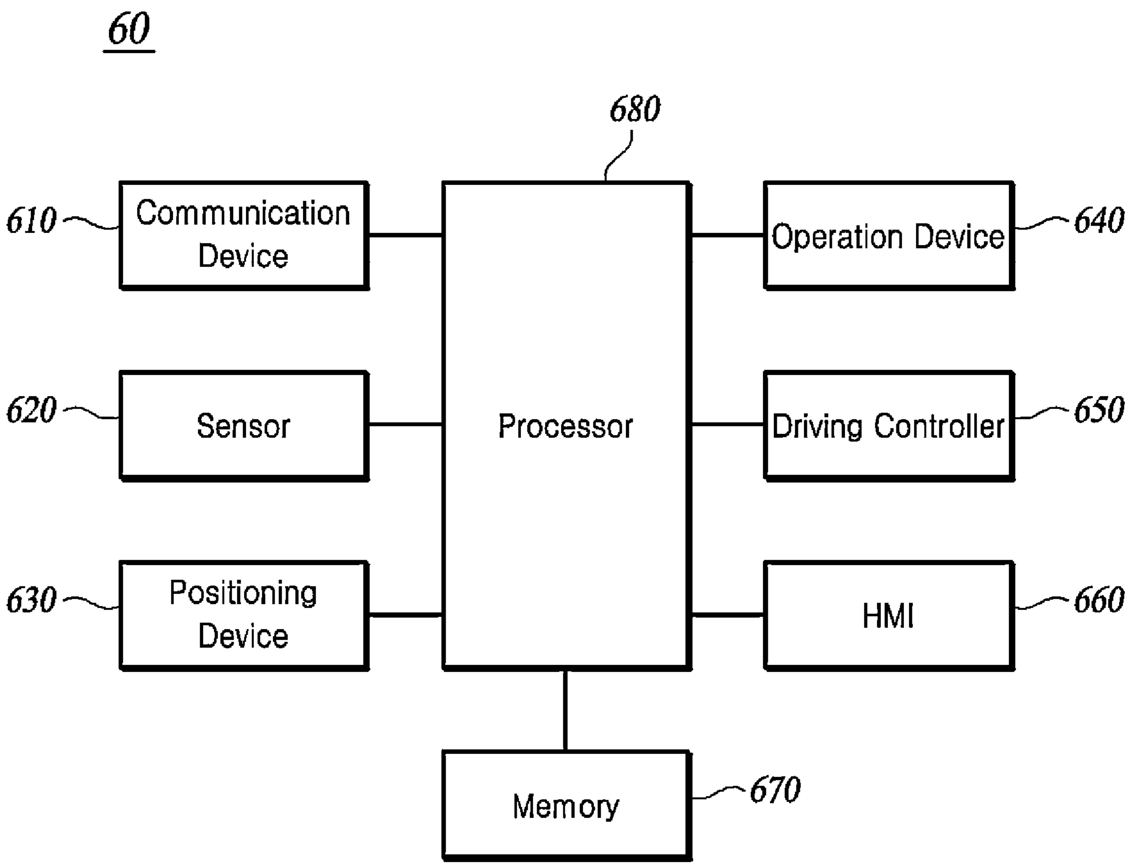
FIG. 6 is a schematic block diagram illustrating an example vehicle that can be used to implement the method or apparatus.

FIG. 6 is a schematic block diagram illustrating an example vehicle that can be used to implement the method or apparatus.

The vehicle 60 may include at least one of a communication device 610, a sensor 620, a positioning device 630, an operation device 640, a driving controller 650, a human machine interface unit (HMI) 660, a memory 670, and a controller or processor 680. The vehicle 60 may include a vehicle control device 10 structurally and/or functionally.

The communication device 610 may exchange signals with devices positioned outside and inside the vehicle 60. The communication device 610 may exchange a signal with at least one of an infrastructure device such as a server or a base station, another vehicle, and a terminal. The communication device 610 may include at least one of a transmission antenna, a reception antenna, a radio frequency (RF) circuit capable of implementing various communication protocols, and an RF element to perform communication. The communication device 610 may include an internal communication part and an external communication part. The internal communication part may transmit or receive signals using various communication protocols present in the vehicle 60. In this regard, an internal communication protocol may include at least one of a controller area network (CAN), a CAN with flexible data rate (CAN FD), ethernet, local interconnect network (LIN), and FlexRay. The communication protocol may include other protocols for performing communication between various devices mounted on the vehicle. The external communication part may perform communication with other vehicles, an infrastructure system, a base station, or a roadside device using various communication protocols. In this regard, the external communication protocol may include vehicle-to-everything (V2X) communication including vehicle-to-vehicle (V2V) communication, vehicle-to-infrastructure (V2I) communication, vehicle-to-network (V2N) communication, and vehicle-to-pedestrian (V2P) communication. The infrastructure may be, for example, a roadside unit or server that periodically transmits traffic information in conjunction with a transportation information system (TIS) or an intelligent transport system (ITS).

The sensor 620 may sense the state of the vehicle 60 and an external object.

In order to sense the state of the vehicle 60, the sensor 620 may include at least one of an inertial measurement unit (IMU), a distance measuring instrument (DMI), a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, and a pedal position sensor. On the other hand, the IMU sensor may include one or more of an acceleration sensor, a gyro sensor, and a magnetic sensor. The sensor 620 may generate state data of the vehicle, based on a signal generated from at least one sensor. For example, direction information such as the heading and yaw rate of the vehicle 60 may be collected by the sensor 620.

In order to sense the external object, the sensor 620 may include at least one of a camera, a radar sensor, a light detection and ranging (LiDAR) sensor, an ultrasonic sensor, and an infrared sensor. The sensor 620 may measure at least one of information about the presence or absence of an object, information about a position of an object, information about a distance between the vehicle 60 and an object, and information about relative speed between the vehicle 60 and an object.

The positioning device 630 may generate position data of the vehicle 60. The positioning device 630 may include at least one of a global positioning system (GPS), a differential global positioning system (DGPS), or a global navigation satellite system (GNSS). The positioning device 630 may generate the position data of the vehicle 60 based on a signal generated from at least one of the GPS, the DGPS, or the GNSS. The positioning device 630 may estimate the position of the vehicle 60 based on wireless signals received from the communication device 610. The positioning device 630 may estimate the current position of the vehicle 60 based on the previous position, travel distance information, moving time information, speed information, or acceleration information of the vehicle 60 using the IMU or DMI. Meanwhile, the processor 680 may estimate the path history and path prediction of the vehicle 60 based on the position information of the vehicle 60 collected by the positioning device 630.

The operation device 640 receives a user input for driving. In a manual mode, the vehicle 60 may be driven based on a signal provided by the operation device 640. The operation device 640 may include a steering input device such as a steering wheel, an acceleration input device such as an accelerator pedal, and a brake input device such as a brake pedal.

The driving controller 650 is a device that electrically controls various vehicle driving devices in the vehicle 60. The driving controller 650 may include a power train driving control device, a chassis driving control device, a brake control device, an acceleration control device, a door/window driving control device, a safety device driving control device, a lamp driving control device, and an air conditioning driving control device. The driving controller 650 controls the movement of the vehicle 60 based on the input signal of the operation device 640 or the control signal of the processor 680.

The HMI 660 is a device for communication between the vehicle 60 and a human (e.g., an occupant of the vehicle 60 or other vehicle). The HMI 660 may receive a user input and provide information generated in the vehicle 60 to the user. The vehicle 60 may implement a user interface (UI) or user experience (UX) through the HMI 660. The HMI 660 may include an input device such as a touch panel or a microphone, and the HMI 660 may include an output device such as a display device or a speaker. For example, the HMI 660 may include an interior display that outputs a screen toward the inside of the vehicle 60 and/or an exterior display that outputs a screen toward the outside of the vehicle.

The memory 670 may store a program that causes the processor 680 to perform a method according to an embodiment of the present disclosure. For example, the program may include a plurality of instructions executable by the processor, and the method according to an embodiment of the present disclosure may be performed by executing the plurality of instructions by the processor.

The memory 670 may be a single memory or a plurality of memories. When the memory 670 is formed of the plurality of memories, the plurality of memories may be physically separated. The memory 670 may include at least one of a volatile memory and a non-volatile memory. The volatile memory includes a static random access memory (SRAM) or a dynamic random access memory (DRAM), while the non-volatile memory includes a flash memory.

The memory 670 may store map information. The map information may be a navigation map and/or a high definition map (HD map). The HD map may be received from an external device or stored in advance. The navigation map includes a node indicating a point where at least two roads meet and a link connecting two nodes. The navigation map may include geographic information, road information, lane information, building information, or signal information. The HD map incorporates more specific data compared to the navigation map. The ADAS map may include road gradient, road curvature, or sign information, based on a road. The HD map may include lane information, lane boundary information, stop line position, traffic light position, signal sequence, or intersection information, based on a lane. The HD map may include basic road information, surrounding environment information, detailed road environment information, or dynamic road condition information. The detailed road environment information may include static information such as elevation of terrain, curvature, lane, lane centerline, regulation line, road boundary, road centerline, traffic sign, road surface sign, shape and height of the road, lane width, and the like. The dynamic road condition information may include traffic congestion, an accident section, a construction section, and the like. The HD map may include road surrounding environment information implemented in 3D, geometric information such as road shape or facility structure, and semantic information such as traffic signs or lane marks.

The processor 680 may include at least one core capable of executing at least one command. The processor 680 may execute the instructions stored in the memory 670. The processor 680 may be a single processor or a plurality of processors.

According to one or more aspects of the disclosure, a vehicle control apparatus may comprise: a reception unit for recognizing a plurality of events comprising a first event and a second event, and receiving information of the plurality of events and information comprising a set speed of a vehicle and a current speed of the vehicle; a determination unit for determining whether a control starting condition is satisfied; a calculation unit for calculating a control reference distance, calculating a target speed using the control reference distance, and modifying the target speed; and a vehicle control unit for performing control comprising acceleration and deceleration so that the vehicle travels at the target speed when the control starting condition is satisfied.

The determination unit may determine that the control starting condition is satisfied when the vehicle is located in a first event section, the set speed is higher than a speed limit of the first event, and the control reference distance is shorter than a distance between an end point of the first event and a start point of the second event.

The calculation unit may calculate the target speed using the set speed, a distance between an end point of the first event and a start point of the second event, and the control reference distance.

The calculation unit may be able to modify the target speed by multiplying the target speed by a predefined positive number equal to or less than 1.

The calculation unit may modify the target speed when the vehicle passes an end point of a first event section, and the target speed is lower than the current speed or lower than a speed limit of the second event.

The calculation unit may modify the target speed to a faster speed among the current speed and the speed limit of the second event.

The calculation unit may calculate the control reference distance by adding an acceleration distance and a deceleration distance.

The vehicle control unit may control the vehicle to travel at the set speed when the determination unit determines that the control starting condition is not satisfied.

The vehicle control unit may control the vehicle to travel at a speed limit of an event section when the vehicle is located in the event section.

A method for controlling, by a vehicle control apparatus, speed of a vehicle may comprise one or more operations described above. The method may be implemented in a non-transitory computer-readable medium storing instructions that, when executed, cause performance of one or more operations described herein.

Each element of the apparatus or method according to the present disclosure may be implemented in hardware, software, or a combination of hardware and software. Further, the function of each element may be implemented in software, and the microprocessor may be implemented to execute the function of software corresponding to each element.

Various implementations of the systems and techniques described herein can be realized by digital electronic circuitry, integrated circuitry, FPGAs (field programmable gate arrays), ASICs (application specific integrated circuits), computer hardware, firmware, software, and/or combinations thereof. These various implementations can include implementation in one or more computer programs that are executable on a programmable system. The programmable system includes at least one programmable processor (which may be a special-purpose processor or a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable recording medium".

The computer-readable recording medium includes all or some types of recording devices in which data readable by a computer system is stored. These computer-readable recording media may include non-volatile or non-transitory media, such as ROM, CD-ROM, magnetic tape, floppy disk, memory card, hard disk, magneto-optical disk, and storage device, and may further include transitory media such as data transmission media. In addition, the computer-readable recording medium may be distributed in network-connected computer systems, and computer-readable codes may be stored and executed in a distributed manner.

Although the flowcharts/timing diagrams of the present specification are shown to sequentially implement each process, this is merely illustrative of the technical idea of one or more examples of the present disclosure. In other words, a person having ordinary skill in the art may make various modifications and alterations by changing the sequences described in the flowcharts/timing diagrams or executing one or more of the processes in parallel, without departing from the essential characteristics of one of more features of the present disclosure, and therefore the flowcharts/timing diagrams are not limited to a chronological order.

Although various examples of the present disclosure have been described for illustrative purposes, those skilled in the art will appreciate that various modifications, additions, and substitutions are possible, without departing from the idea and scope of the claimed features. Therefore, the examples of the present disclosure have been described for the sake of brevity and clarity. The scope of the technical idea of the examples of the present disclosure is not limited by the illustrations. Accordingly, one of ordinary skill would understand the scope of the claimed features is not to be limited by the above explicitly described examples but by the claims and equivalents thereof.

What is claimed is:

1. An apparatus, comprising:
- at least one sensor;
- one or more processors; and
- memory storing instructions that, when executed by the one or more processors, cause the apparatus to:
  - determine, based on at least one of sensing information of the at least one sensor or navigation information, a plurality of events comprising a first event and a second event, wherein the first event is associated with a first speed control in a first section of a driving route of a vehicle, and wherein the second event is associated with a second speed control in a second section of the driving route;
  - determine information of the plurality of events and information of the vehicle, wherein the information of the vehicle comprises a set speed of the vehicle and a current speed of the vehicle;
  - determine a reference distance for determining whether to perform a target speed adjustment for the vehicle in an intermediate section, of the driving route, between an end point of the first section and a starting point of the second section;
  - determine, based on the reference distance, an adjusted target speed in the intermediate section; and
  - perform, based on the adjusted target speed, a speed control of the vehicle driving in the intermediate section.

2. The apparatus of claim 1, wherein the instructions, when executed by the one or more processors, cause the apparatus to determine to perform the target speed adjustment based on:
- the vehicle being located in the first section or the intermediate section,
- the set speed being higher than a speed limit of the second event, and
- the reference distance being greater than a distance between the end point of the first section and the starting point of the second section.

3. The apparatus of claim 1, wherein the instructions, when executed by the one or more processors, cause the apparatus to determine the adjusted target speed further based on:
- the set speed, and
- a distance between the end point of the first section and the starting point of the second section.

4. The apparatus of claim 1, wherein the instructions, when executed by the one or more processors, cause the apparatus to determine the adjusted target speed by multiplying an initial adjusted target speed by a predefined positive number equal to or less than 1.

5. The apparatus of claim 1, wherein the instructions, when executed by the one or more processors, cause the apparatus to determine the adjusted target speed after the vehicle passes the end point of the first section.

6. The apparatus of claim 5, wherein the instructions, when executed by the one or more processors, cause the apparatus to determine the adjusted target speed to be slower than an unadjusted target speed.

7. The apparatus of claim 1, wherein the instructions, when executed by the one or more processors, cause the apparatus to determine the adjusted target speed to be faster than or equal to both the current speed of the vehicle and a speed limit of the second event.

8. The apparatus of claim 1, wherein the instructions, when executed by the one or more processors, cause the apparatus to determine the reference distance such that the reference distance includes an acceleration distance and a deceleration distance.

9. The apparatus of claim 1, wherein the instructions, when executed by the one or more processors, cause the apparatus to control the vehicle to travel at the set speed before a control starting condition being satisfied.

10. The apparatus of claim 1, wherein the instructions, when executed by the one or more processors, cause the apparatus to control the vehicle to travel at a speed limit of the second section when the vehicle is located in the second section.

11. A method performed by an apparatus of a vehicle, the method comprising:

determining, based on at least one of sensing information of at least one sensor or navigation information, a plurality of events comprising a first event and a second event, wherein the first event is associated with a first speed control in a first section of a driving route of the vehicle, and wherein the second event is associated with a second speed control in a second section of the driving route;

determining information of the plurality of events and information of the vehicle, wherein the information of the vehicle comprises a set speed of the vehicle and a current speed of the vehicle;

determining a reference distance for determining whether to perform a target speed adjustment for the vehicle in an intermediate section, of the driving route, between an end point of the first section and a starting point of the second section;

determining, based on the reference distance, an adjusted target speed in the intermediate section; and performing, based on the adjusted target speed, a speed control of the vehicle driving in the intermediate section.

12. The method of claim 11, further comprising determining whether to perform the target speed adjustment based on:

the vehicle being located in the first section or the intermediate section, the set speed being higher than a speed limit of the second event, and the reference distance being greater than a distance between the end point of the first section and the starting point of the second section.

13. The method of claim 11, wherein the adjusted target speed is determined further based on the set speed and a distance between the end point of the first section and the starting point of the second section.

14. The method of claim 11, wherein the adjusted target speed is determined by multiplying an initial adjusted target speed by a predefined positive number equal to or less than 1.

15. The method of claim 11, wherein the adjusted target speed is determined after the vehicle passes the end point of the first section.

16. The method of claim 15, wherein the adjusted target speed is determined to be slower than an unadjusted target speed.

17. The method of claim 11, wherein the reference distance includes an acceleration distance and a deceleration distance.

18. The method of claim 11, further comprising controlling the vehicle to travel at the set speed before the control starting condition being satisfied.

19. The method of claim 11, further comprising controlling the vehicle to travel at a speed limit of the second section when the vehicle is located in the second section.

20. An apparatus, comprising:

at least one sensor;

one or more processors; and memory storing instructions that, when executed by the one or more processors, cause the apparatus to:

determine, based on at least one of sensing information of the at least one sensor or navigation information, a plurality of events comprising a first event and a second event, wherein the first event is an event having a start point or an end point closest to a vehicle among the plurality of events, and wherein the second event is an event having a start point closest to the end point of the first event;

determine information of the plurality of events and information of the vehicle, wherein the information of the vehicle comprises a set speed of the vehicle and a current speed of the vehicle, wherein the set speed is a speed preset by a driver or a user;

determine a target speed for controlling the vehicle in an intermediate section, of a driving route, between an end point of a first section and a starting point of a second section, wherein the target speed is determined based on the set speed, and wherein the first section is defined as a section between the start point of the first event and the end point of the first event, and the second section is defined as a section between the start point of the second event and an end point of the second event;

determine a reference distance for determining whether to perform a target speed adjustment for the vehicle in the intermediate section;

determine, based on the reference distance, an adjusted target speed in the intermediate section that enables the vehicle to travel without sudden acceleration or deceleration; and perform, based on the adjusted target speed, a speed control of the vehicle driving in the intermediate section.

* * * * *